United States Patent
Zhao et al.

(10) Patent No.: US 10,466,568 B2
(45) Date of Patent: Nov. 5, 2019

(54) LIQUID CRYSTAL LENS, 3D DISPLAY PANEL AND METHODS FOR CONTROLLING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenqing Zhao, Beijing (CN); Xiaochuan Chen, Beijing (CN); Qian Wang, Beijing (CN); Jian Gao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 15/554,818

(22) PCT Filed: Feb. 13, 2017

(86) PCT No.: PCT/CN2017/073328
§ 371 (c)(1),
(2) Date: Aug. 31, 2017

(87) PCT Pub. No.: WO2017/202059
PCT Pub. Date: Nov. 30, 2017

(65) Prior Publication Data
US 2018/0107089 A1    Apr. 19, 2018

(30) Foreign Application Priority Data
May 26, 2016    (CN) .......................... 2016 1 0356596

(51) Int. Cl.
G02B 27/00    (2006.01)
G02F 1/29     (2006.01)
G02B 27/22    (2018.01)

(52) U.S. Cl.
CPC ........... *G02F 1/29* (2013.01); *G02B 27/0093* (2013.01); *G02B 27/2214* (2013.01)

(58) Field of Classification Search
CPC .................. G02B 27/0093; G02B 27/2214
See application file for complete search history.

(56) References Cited

U.S. PATENT DOCUMENTS

2014/0375778 A1*  12/2014  Miao ................. H04N 13/31
                                                   348/51
2015/0312546 A1   10/2015  Hasegawa et al.

FOREIGN PATENT DOCUMENTS

CN    102572483 A    7/2012
CN    103852949 A    6/2014
(Continued)

OTHER PUBLICATIONS

English translation of PCT International Search Report, Application No. PCT/CN2017/073328, dated May 25, 2017, 3 pages.
(Continued)

*Primary Examiner* — Thanh Nhan P Nguyen
(74) *Attorney, Agent, or Firm* — Armstrong Teasdale LLP

(57) ABSTRACT

The present disclosure relates to a liquid crystal lens, a 3D display panel and methods for controlling the same. A liquid crystal lens for a 3D display panel, including a first substrate, a second substrate, a plurality of first electrodes arranged on the first substrate, a second electrode arranged on the second substrate, a liquid crystal layer arranged between the first substrate and the second substrate, and a control unit. The control unit is configured to control a voltage of the first electrode and of the second electrode so that liquid crystal molecules in the liquid crystal layer deflect to form a
(Continued)

plurality of lens equivalent units, and the control unit is further configured to adjust the voltage of the first electrode to change a position of each of the lens equivalent units.

8 Claims, 5 Drawing Sheets

(56) References Cited

FOREIGN PATENT DOCUMENTS

| | | | |
|---|---|---|---|
| CN | 104007585 | A | 8/2014 |
| CN | 203909440 | U | 10/2014 |
| CN | 105446028 | A | 3/2016 |
| CN | 105446050 | A | 3/2016 |
| CN | 105607379 | A | 5/2016 |
| CN | 105954956 | A | 9/2016 |

OTHER PUBLICATIONS

PCT Written Opinion, Application No. PCT/CN2017/073328, dated May 25, 2017, 6 pages.: with English translation of relevant part.
China First Office Action, Application No. 201610356596.8, dated Sep. 1, 2017, 14 pps.: with English translation.
China Second Office Action, Application No. 201610356596.8, dated Feb. 14, 2018, 13 pps.: with English translation.

* cited by examiner

LIQUID CRYSTAL LENS, 3D DISPLAY PANEL AND METHODS FOR CONTROLLING THE SAME

CROSS REFERENCE TO RELATED APPLICATIONS

This patent application is a National Stage Entry of PCT/CN2017/073328 filed on Feb. 13, 2017, which claims the benefit and priority of Chinese Patent Application No. 201610356596.8 filed on May 26, 2016, the disclosures of which are incorporated herein by reference in their entirety as part of the present application.

BACKGROUND

The present disclosure relates to the field of display technologies, and more particularly, to a liquid crystal lens, a 3D display panel, and methods for controlling the same.

In recent years, with the rapid development of three dimensional (3D) display technologies, 3D products become more and more popular, 3D displays gradually go into public families, and the majority of people do not feel unfamiliar to 3D display. Over the past decade, 3D display technologies mainly rely on 3D glasses to implement 3D display. To further improve viewing comfort and get rid of dependence on the 3D glasses, people keep trying watching 3D images using naked eyes. This field rapidly becomes one of research hotspots at present.

Also known as free stereoscopic display, naked eye 3D display mainly utilizes eye parallax characteristics, to present Realistic stereoscopic image with spatial depth and image suspended outside the screen in the viewer naked conditions (unnecessary to wear auxiliary devices such as helmets or polariscopes).

Cylindrical lens 3D technology is one of frequently-used naked-eye 3D technologies. The biggest advantage of the cylindrical lens 3D technology is that brightness is not negatively affected. Principles of the cylindrical lens 3D technology are as below: a liquid crystal lens is arranged in front of a liquid crystal display so that an image plane of the liquid crystal display is positioned in a focal plane of the lens, pixels of an image under each lens are divided into left eye pixels and right eye pixels, and the lens may project the left eye pixels and the right eye pixels in different directions, so that left eyes of the viewers can see the left eye pixels and right eyes of the viewers can see the right eye pixels, thereby forming 3D images.

BRIEF DESCRIPTION

Embodiments of the present disclosure provide a liquid crystal lens, a 3D display panel, and methods for controlling the same, capable of changing positions of lens equivalent units by adjusting voltages of electrodes, so that a problem of crosstalk caused when eyes move can be improved.

An embodiment of the present disclosure provides a liquid crystal lens for a 3D display panel, which includes a first substrate, a second substrate, a plurality of first electrodes arranged on the first substrate, a second electrode arranged on the second substrate, a liquid crystal layer arranged between the first substrate and the second substrate, and a control unit. The control unit is configured to control a voltage of the first electrode and of the second electrode so that liquid crystal molecules in the liquid crystal layer deflect to form a plurality of lens equivalent units, and the control unit is further configured to adjust the voltage of the first electrode to change a position of each of the lens equivalent units.

In an example, the liquid crystal lens further includes an eye tracking unit, which is configured to track a change of a position of viewer's eyes.

The control unit is further configured to adjust the voltage of the first electrode according to the change of the position of the viewer's eye so that the position of each of the lens equivalent units varies with the change of the position of the viewer's eye.

In an example, the control unit is further configured to adjust, by adjusting the voltage of the first electrode, the number of the first electrodes corresponding to each of the lens equivalent units so as to change an aperture of each of the lens equivalent units.

In an example, the first electrodes are strip-shaped electrodes or dot matrix electrodes, and the second electrode is a planar electrode.

In an example, the lens equivalent unit is cylindrical.

In an example, the position of each of the lens equivalent units is confined by 3-20 first electrodes.

In another embodiment, there is provided a 3D display panel, which includes a display module and the liquid crystal lens according to any one of the preceding embodiments, wherein the liquid crystal lens is positioned at a light exit side of the display module.

In an example, each of the lens equivalent units corresponds to two adjacent rows of pixels in the display module, or each of the lens equivalent units corresponds to two adjacent columns of pixels in the display module so that when displayed, an image corresponding to left eye pixels comes into sight of the left eye of the viewer and an image corresponding to right eye pixels comes into sight of the right eye of the viewer.

Another embodiment of the present disclosure provides a method for controlling the liquid crystal lens according to any one of the preceding embodiments, which includes adjusting the voltage of the first electrode by the control unit to change the position of each of the lens equivalent units.

In an example, the method further includes detecting a change of a position of a viewer's eye by an eye tracking unit, wherein adjusting the voltage of the first electrode by the control unit includes adjusting the voltage of the first electrode according to the change of the position of the viewer's eye by the control unit.

In an example, the method further includes adjusting, by adjusting the voltage of the first electrode by the control unit, the number of the first electrodes corresponding to each of the lens equivalent units so as to change an aperture of each of the lens equivalent units.

In still another embodiment, a method for controlling the 3D display panel according to any one of the preceding embodiments includes adjusting the voltage of the first electrode by the control unit to change the position of each of the lens equivalent units so that a left eye image corresponding to left eye pixels of the display panel comes into sight of the left eye of the viewer and a right eye image corresponding to right eye pixels of the display panel comes into sight of the right eye of the viewer.

In an example, the method further includes detecting a change of a position of a viewer's eye by an eye tracking unit, wherein adjusting the voltage of the first electrode by the control unit includes adjusting the voltage of the first electrode according to the change of the position of the viewer's eye by the control unit.

In an example, the method further includes adjusting, by adjusting the voltage of the first electrode by way of the control unit, the number of the first electrodes corresponding to each of the lens equivalent units so as to change an aperture of each of the lens equivalent units.

In the embodiments described herein, the position of each of the lens equivalent units may be changed by adjusting the voltage of the first electrode by the control unit, the position of the lens equivalent unit may thus be adjusted in real time when the positions of the viewer's eyes change to prevent the crosstalk caused when the positions of the viewer's eyes change.

Further aspects and scopes of the present disclosure become apparent from the description provided herein. It should be understood that various aspects of the present disclosure may be implemented separately or in combination with one or more other aspects. It should also be understood that the description in the present disclosure and objectives which are intended to be merely described in the specific embodiments are not intended to limit the scope of the present disclosure.

BRIEF DESCRIPTION OF THE DRAWINGS

The accompanying drawings described herein are merely for the purpose of describing the selected embodiments and are not all possible implementations and are not intended to limit the scope of the present disclosure.

In the drawings.

DETAILED DESCRIPTION

To make the technical solutions and the advantages of the present disclosure clearer, exemplary embodiments will be described more fully with reference to accompanying drawings.

Figure 1A:
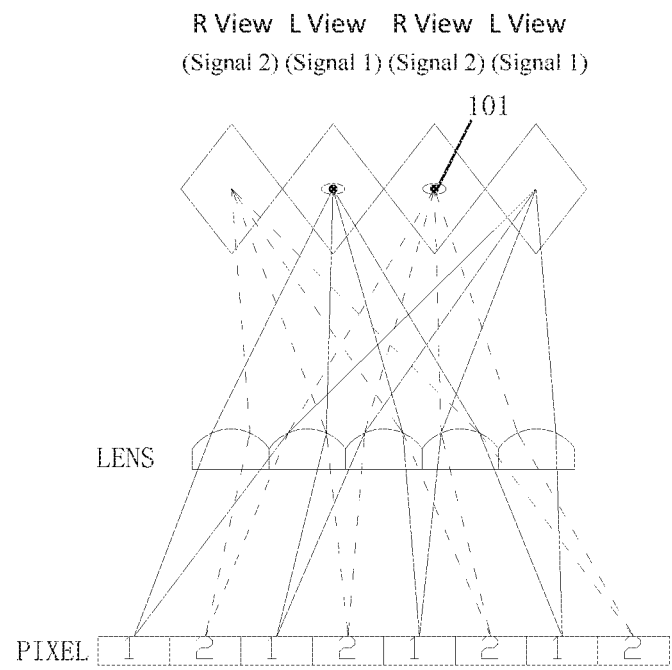
FIG. 1A and FIG. 1B respectively schematically illustrate optical paths indicating that a signal is received correctly before eyes move and that a signal is received mistakenly (that is, a viewing dead zone is reached) after the eyes moves.
Figure 1B:
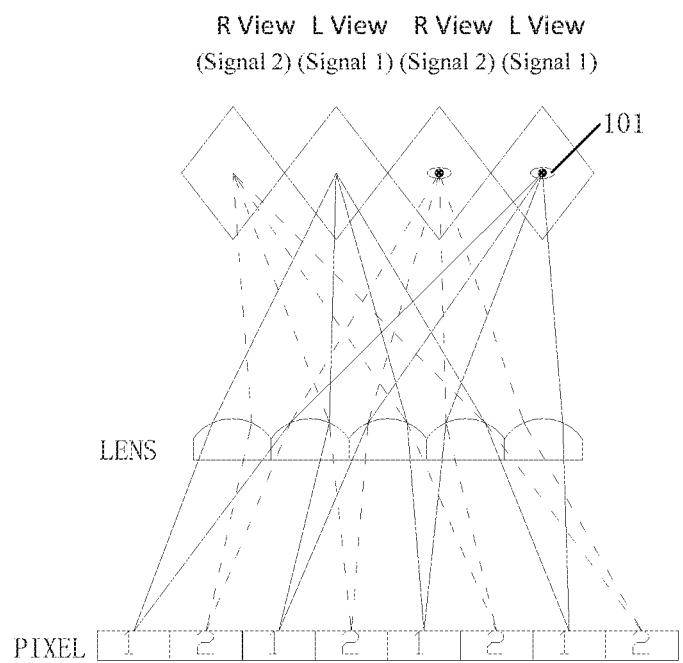
Figure 1:
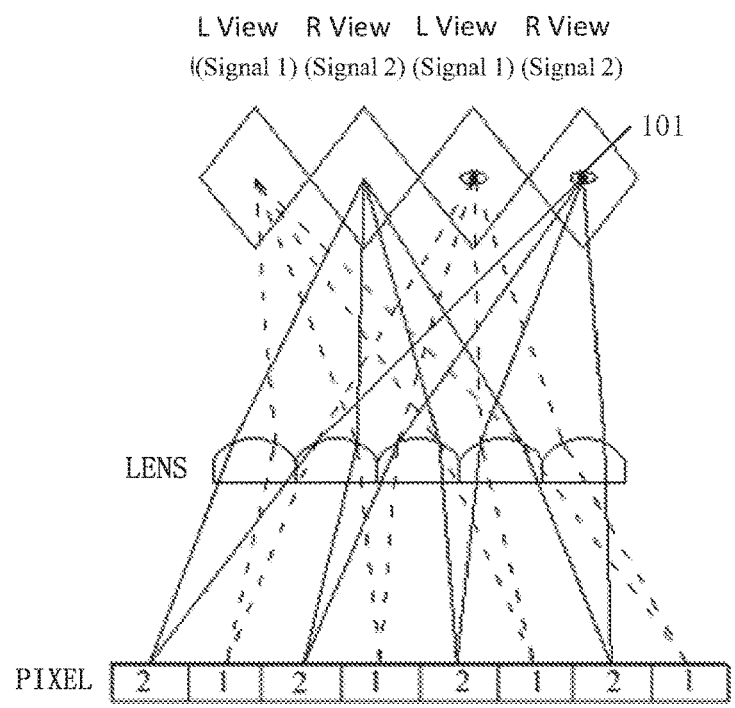
FIG. 1C schematically illustrates an optical path for improving crosstalk by interchanging the positions of Pixel 1 and Pixel 2 in the related technologies.

In technologies related to 3D display, the problem of image crosstalk is an important factor having a negative effect on 3D display performance. When the viewer moves eyes before a screen, an image that should have entered the right eye may likely be received by the left eye, whereas an image that should have entered the left eye may likely be received by the right eye, which may cause a signal to be received mistakenly, and thus the viewer cannot view a correct image. FIG. 1A and FIG. 1B respectively schematically illustrate optical paths indicating that a signal is received correctly before eyes 101 move and that a signal is received mistakenly (that is, a viewing dead zone is reached) after the eyes 101 move. When the viewer's eyes 101 are in the positions as shown in FIG. 1A, a signal (L view signal) of the left eye pixel 1 enters the left eye of the viewer through the lens, and a signal (R view signal) of the right eye pixel 2 enters the right eye of the viewer. The image is received correctly, and thus the viewer may view a correct three-dimensional image. When the viewer's eyes 101 move and deviate from the positions of FIG. 1A (for example, moving right), a part of left eye signals may enter the right eye, while a part of right eye signals may enter the left eye, and thus crosstalk may be generated. When the viewer's eyes 101 move to the positions as shown in FIG. 1B, the signal (L view signal) of the left eye pixel 1 completely enters the right eye of the viewer, while the signal (R view signal) of the right eye pixel 2 completely enters the left eye of the viewer, which causes the signal to be received completely mistakenly, that is, a viewing dead zone is reached, and thus the viewer cannot view a correct three-dimensional image.

Figure 2:
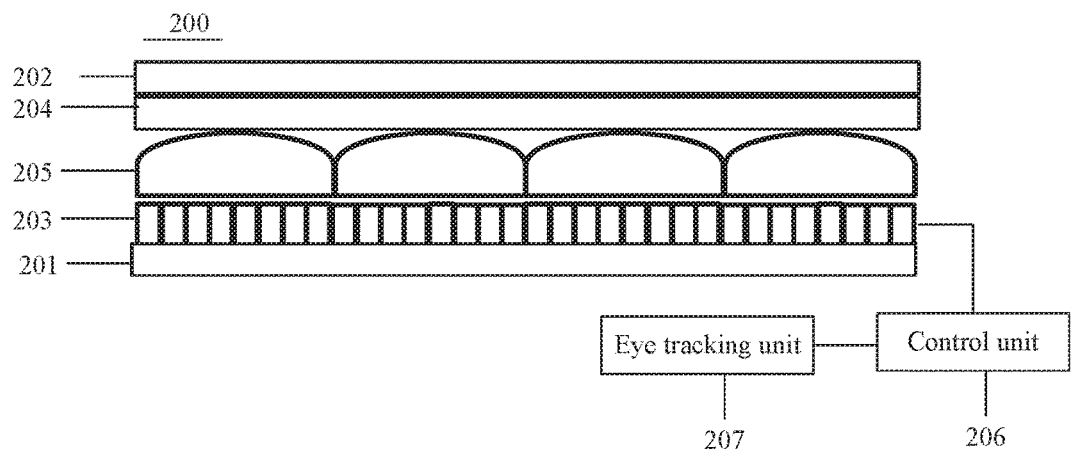
FIG. 2 schematically illustrates a sectional view of an exemplary liquid crystal lens according to one embodiment of the present disclosure.

FIG. 2 schematically illustrates a sectional view of an exemplary liquid crystal lens 200 according to one embodiment of the present disclosure. The exemplary liquid crystal lens 200 is capable of, when used for 3D display panel, changing the position of the lens equivalent unit by adjusting the voltages of electrodes, so that the problem of crosstalk caused when an eye moves may be improved.

As shown in FIG. 2, a liquid crystal lens 200 for a 3D display panel includes a first substrate 201, a second substrate 202, a plurality of first electrodes 203 arranged on the first substrate 201, a second electrode 204 arranged on the second substrate 202, a liquid crystal layer arranged between the first substrate 201 and the second substrate 202, and a control unit 206 directly or indirectly connecting the first electrodes 203. The control unit 206 is configured to control a voltage of the first electrode 203 and of the second electrode 204 so that liquid crystal molecules in the liquid crystal layer deflect to form a plurality of lens equivalent units 205, and is further configured to adjust the voltage of the first electrode 203 to change a position of each lens equivalent unit 205.

In the embodiment, the first electrodes 203 may be strip-shaped electrodes, and the second electrode 204 may be a planar electrode. In operation, the second electrode 204 may be used as a common electrode, to which a fixed voltage is applied, and voltages of respective first electrodes 203 are controlled by the control unit 206 to form different electric fields between the first electrodes 203 and the second electrode 204. The electric fields may drive the liquid crystal molecules in the liquid crystal layer to deflect so as to form the lens equivalent units 205.

In the embodiment, the control unit may adjust the voltages of the first electrodes 203 to change the electric fields between the first electrodes and the second electrode so as to change positions of the lens equivalent units. In this configuration, positions of the lens equivalent unit may be adjusted in real time when the positions of the viewer's eyes change, to prevent the crosstalk caused when the positions of the viewer's eyes change.

In a particular embodiment, the liquid crystal lens further includes an eye tracking unit 207, which is configured to track the change of the positions of the viewer's eyes. In such a case, the control unit 206 is configured to adjust the voltages of the first electrodes 203 according to the change of the positions of the viewer's eyes tracked by the eye tracking unit 207 so that the position of each of the lens equivalent units 205 varies with the change of the positions of the viewer's eyes.

Figures 3A, 3B:
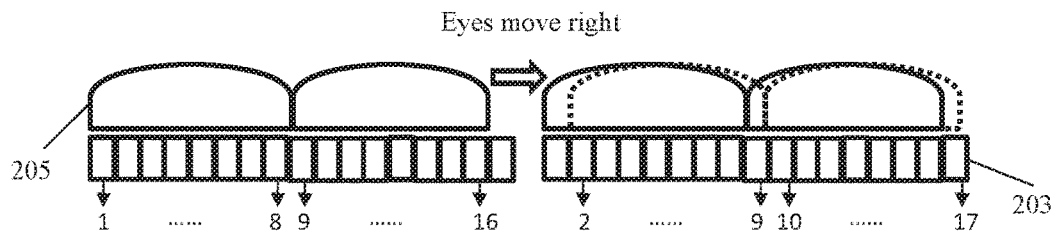
FIG. 3A and FIG. 3B illustrate schematic diagrams of a positional relation between a first electrode and a lens equivalent unit before and after the eye moves.

It is to be understood that changing the position of each of the lens equivalent units by adjusting the magnitude of voltages of the first electrodes by the control unit is actually equivalent to a fact that the position of each of the lens equivalent units is changed by changing the first electrodes corresponding to each of the lens equivalent units. FIG. 3A and FIG. 3B illustrate schematic diagrams of a positional relation between the first electrodes 203 and the lens equivalent unit 205 before and after the eye moves. In this exemplary embodiment, as shown in FIG. 3A and FIG. 3B, each of the lens equivalent units 205 corresponds to eight first electrodes, that is, each lens equivalent unit 205 is confined by eight first electrodes 201. Specifically, in FIG. 3A, the first lens equivalent unit is confined by the first electrodes numbered as 1-8, and the second lens equivalent unit is confined by the first electrodes numbered as 9-16. As shown in FIG. 3B, after the viewer's eyes move right, the voltages of the first electrodes are adjusted according to the movement of the eyes, and thus the first electrodes corresponding to each of the lens equivalent units 205 are adjusted so that the first electrodes numbered as 2-9 correspond to the first lens equivalent unit, and the first electrodes numbered as 10-17 correspond to the second lens equivalent unit. Through this adjustment, the positions of the lens equivalent units may vary with the movement of the viewer's eyes.

It is to be explained that the number of the first electrodes corresponding to each of the lens equivalent units is not limited to eight. For example, each of the lens equivalent units may correspond to 3-20 first electrodes. That is, each of the lens equivalent units is confined by applying particular voltages to every 3-20 electrodes. In an optional embodiment, the number of the first electrodes for confining each of the lens equivalent units is equal. Such a configuration may ensure that the apertures of the lens equivalent units are substantially equal in size. It is to be understood that the larger the number of the first electrodes for confining each of the lens equivalent units is, the more subtly the position of the lens equivalent unit may be adjusted.

As mentioned above, the position of each lens equivalent unit is confined by the positions of the first electrodes corresponding to the lens equivalent unit, so the positions of the first electrodes corresponding to each lens equivalent unit being adjusted according to the change of the positions of the viewer's eyes, corresponds to a fact that the position of the lens equivalent unit varies as the positions of the viewer's eyes are changed. Such configuration can improve crosstalk generated when the viewer's eyes move.

Figures 4A, 4B:
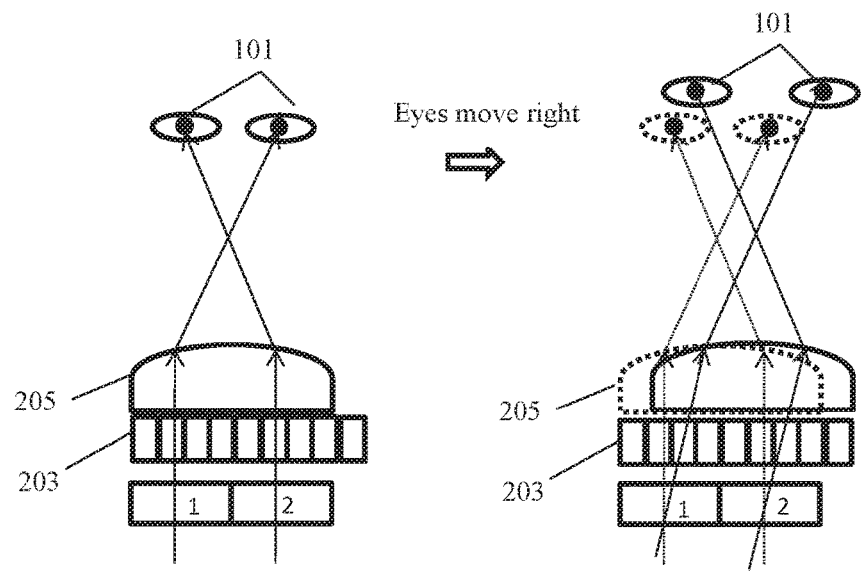
FIG. 4A and FIG. 4B schematically illustrate optical paths before and after the lens equivalent unit moves.

FIG. 4A and FIG. 4B schematically illustrate optical paths before and after the lens equivalent unit moves. In FIG. 4A and FIG. 4B, each of the lens equivalent units corresponds to eight first electrodes and two pixels (Pixel 1 and Pixel 2). When the viewer's eyes are at the position in FIG. 4A, light from Pixel 1 is refracted by the lens equivalent unit 203 and then enters the left eye of the viewer to form a left eye image, and light from Pixel 2 is refracted by the lens equivalent unit 203 and then enters the view area of right eye of the viewer to form a right eye image. If the viewer's eyes move from the positions as shown in FIG. 4A to the positions in FIG. 4B, the position of the lens equivalent unit 205 also moves as the eyes 101 move, so that light coming from Pixel 1, after refracted by the lens equivalent unit 203, still may enter the view area of left eye of the viewer to form the left eye image, whereas light coming from Pixel 2, after refracted by the lens equivalent unit 203, still may enter the view area of right eye of the viewer to form the right eye image. Therefore, the problem of image crosstalk caused by movement of the viewer's eyes may be improved.

In the embodiments described herein, each of the lens equivalent units may correspond to two adjacent rows of subpixels in the display module, wherein the subpixels include subpixel R, subpixel G, and subpixel B.

In a further aspect, in the embodiments of the present disclosure, the first electrodes corresponding to the lens equivalent units may be adjusted, one by one, in real time according to the change of the positions of the viewer's eyes. The width of the first electrode generally is less than that of a pixel. Therefore, a fine adjustment, namely, an adjustment smaller than a pixel level, of the position of the lens equivalent unit may be implemented. Such adjustment is so slight that it is not easy to be perceived by the viewer. Therefore, a viewing comfort degree may be increased for the viewer.

As a contrast, FIG. 1C schematically illustrates an optical path for improving crosstalk by interchanging the positions of Pixel 1 and Pixel 2 in the related technologies. In related technologies, if the viewer's eyes enter a viewing dead zone (such as the position in FIG. 1B), the positions of Pixel 1 and Pixel 2 are interchanged (as shown in FIG. 1C) so that a signal of Pixel 1 still enters sight of the left eye of the viewer and a signal of Pixel 2 still enters sight of the right eye of the viewer. Therefore, a correct image may be viewed. However, this pixel adjustment solution may only adjust between pixels to achieve adjustment at a pixel level, but cannot achieve finer adjustment, which may make the viewer have a feeling of saltation or flicker, thereby having a negative effect on the viewing comfort of the viewer.

Figure 5A:
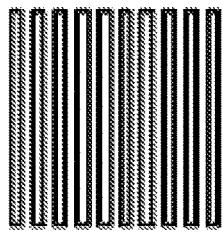
FIG. 5A to FIG. 5D schematically illustrate the first electrodes with four different shapes.
Figure 5B:
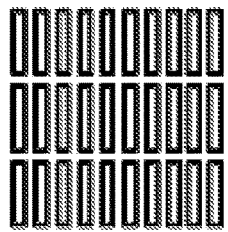
Figure 5C:
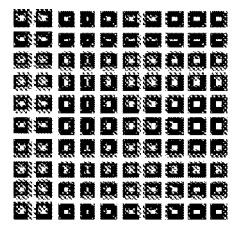
Figure 5D:
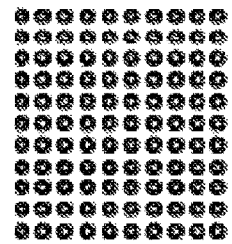

As mentioned above, the first electrodes may be strip-shaped electrodes (as shown in FIG. 5A). However, It is to be understood that shapes of the first electrodes also may be noncontinuous strip shapes (as shown in FIG. 5B), square dot matrix (as shown in FIG. 5C), circular dot matrix (as shown in FIG. 5D) or other electrode shapes that may control, together with second electrode, liquid crystal molecules to deflect so as to form a plurality of lens equivalent units.

In a particular embodiment, the lens equivalent units may be cylindrical.

In another embodiment, the control unit 206 is further configured to adjust, by adjusting the voltage of the first electrode 203, the number of the first electrodes corresponding to each of the lens equivalent units 205 so as to change the aperture of each of the lens equivalent units 205.

Figure 6:
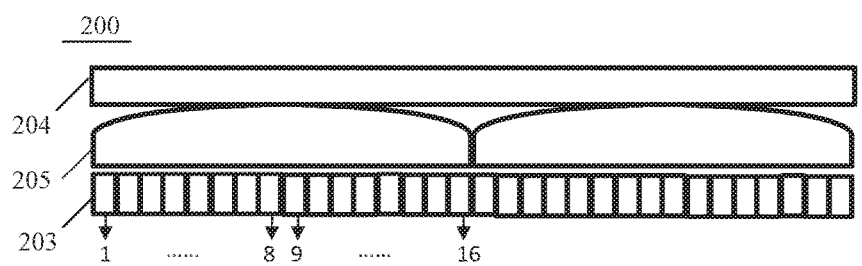
FIG. 6 schematically illustrates a sectional view of a liquid crystal lens in which the apertures of the lens equivalent units are increased.

FIG. 6 schematically illustrates a sectional view of a liquid crystal lens in which the apertures of the lens equivalent units are increased. As shown in FIG. 6, by adjusting the voltages of the first electrodes 203, the control unit 206 may allow each of the lens equivalent units 205 to correspond to 16 first electrodes. That is, each of the lens equivalent unit is confined by the 16 first electrodes 203. Compared with the embodiments as shown in FIG. 2-FIG. 4, the number of the first electrodes corresponding to each of the lens equivalent units 205 increases, and thus the aperture of the lens equivalent unit 205 is correspondingly increased.

Figure 7:
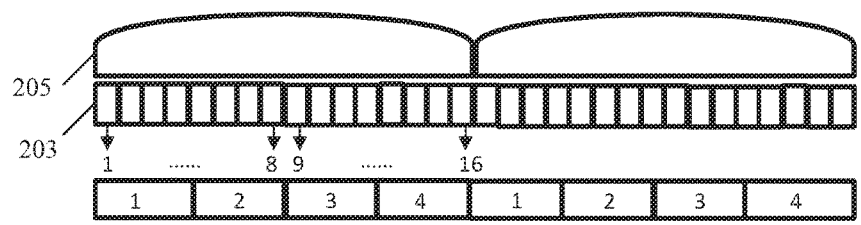
FIG. 7 schematically illustrates an exemplary corresponding relation among a lens equivalent unit, first electrodes and pixels.

If the liquid crystal lens is used in the 3D display panel, the aperture of the lens equivalent unit is increased, and thus the number of columns or rows of pixels positioned beneath each lens equivalent unit is correspondingly increased. Therefore, multi-view mode display may be implemented, and continuous viewing angles of the 3D display device may also be increased. FIG. 7 schematically illustrates an exemplary corresponding relation among lens equivalent unit, first electrodes, and pixels. Compared with FIG. 4, in FIG. 7 the pixels corresponding to each lens equivalent unit are increased from two columns to four columns. Correspondingly, the view mode of the 3D display panel is changed from a two-view mode to a four-view mode.

In the two-view mode, a scenery is photographed from two angles, and during pixel and optical path design, the images photographed from the two angles are alternately arranged according to a sequence of the left eye pixel (Pixel 1) and the right eye pixel (Pixel 2) as shown in FIG. 4, so that the images corresponding to Pixel 1 and Pixel 2 are respectively imaged by the left eye and the right eye of the viewer and are synthesized into a three-dimensional image in brain. Correspondingly, in the four-view mode, a scenery is photographed from four angles, and during pixel and optical path design, the images photographed from respective angles are alternately arranged at positions of Pixel 1, Pixel 2, Pixel 3, and Pixel 4 beneath the lens equivalent unit, so that two adjacent pixels respectively serve as a left eye pixel and a right eye pixel to be imaged by the left eye and the right eye of the viewer. Therefore, if the viewer's eyes slightly move or more than one person watches the screen from different angles, a three-dimensional image synthesized by two images from different angles may be seen. Thus, such four-view mode may increase continuous viewing angle and implement simultaneously watching by more than one person. Similarly, a multi-view mode relates to images photographed from multiple angles.

Figure 8:
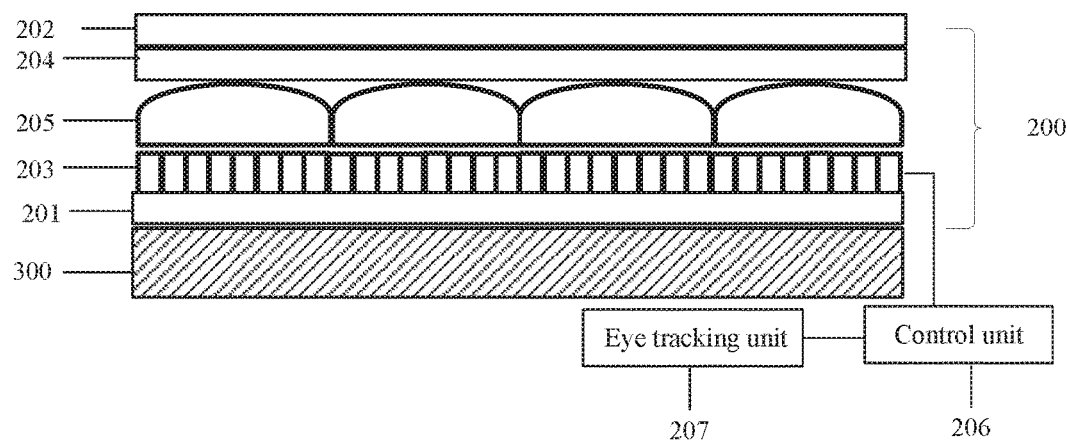
FIG. 8 schematically illustrates a sectional view of an exemplary 3D display panel according to an embodiment of the present disclosure.

FIG. 8 schematically illustrates a sectional view of an exemplary 3D display panel according to an embodiment of the present disclosure.

As shown in FIG. 8, a 3D display panel includes a display module 300 and the liquid crystal lens 200 described in the foregoing embodiments. The liquid crystal lens 200 is positioned at a light exit side of the display module 300.

In the embodiment, the liquid crystal lens 200 is configured to allow an image corresponding to a left eye pixel in the display module 300 to enter sight of the left eye of the viewer and an image corresponding to a right eye pixel to enter sight of the right eye of the viewer. The structures, functions and/or advantages of the liquid crystal lens in this embodiment are the same as those of the liquid crystal lens in the preceding embodiments, which are not unnecessarily elaborated any more herein.

In an exemplary embodiment, each lens equivalent unit 205 corresponds to two rows of pixels in the display module 300, wherein one row includes left eye pixels and the other row includes right eye pixels. Optionally, each lens equivalent unit 205 corresponds to two columns of pixels in the display module 300, wherein one column includes left eye pixels and the other column includes right eye pixels. For example, if each lens equivalent unit corresponds to two columns of pixels, the two-view mode display may be implemented. Light rays coming from the left eye pixel enter the left eye of the viewer after passing through the lens equivalent unit, whereas light rays coming from the right eye pixel enter the right eye of the viewer after passing through the lens equivalent unit.

According to still another embodiment of the present disclosure, there is further provided a method for controlling the preceding liquid crystal lens, which includes adjusting the voltage of the first electrode by the control unit to change the position of each of the lens equivalent units.

Figure 9:
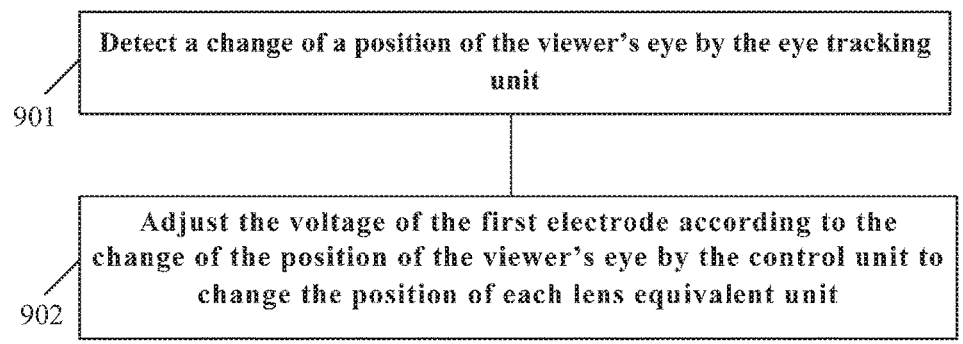
FIG. 9 schematically illustrates a flowchart of a method for controlling a liquid crystal lens.

FIG. 9 schematically illustrates a flowchart of a method for controlling a liquid crystal lens.

As shown in FIG. 9, the method for controlling the 3D liquid crystal lens provided by this embodiment may include following steps:

S901: detecting a change of a position of the viewer's eye by an eye tracking unit; and S902: adjusting the voltage of the first electrode according to the change of the position of the viewer's eye by the control unit to change the position of each lens equivalent unit.

The method for controlling provided by this embodiment is used for the liquid crystal lenses described in the preceding embodiments and shown in FIG. 2. The structures, functions and/or advantages of the liquid crystal lens in this embodiment are the same as those of the liquid crystal lens in the preceding embodiments, and thus are not unnecessarily elaborated any more herein.

According to the method for controlling the liquid crystal lens provided by this embodiment, if the viewer's eyes move, the position of the lens equivalent unit may be timely adjusted, so that light coming from the left eye pixel, after refracted by the lens equivalent unit, still may enter a view area of left eye of the viewer to form a left eye image, whereas light coming from the right eye pixel, after refracted by the lens equivalent unit, still may enter a view area of right eye of the viewer to form a right eye image. Therefore, the problem of image crosstalk caused by movement of the viewer's eyes may be improved.

In an exemplary embodiment, the method for controlling the liquid crystal lens further includes adjusting, by adjusting the voltage of the first electrode by the control unit, the number of the first electrodes corresponding to each of the lens equivalent units so as to change an aperture of each of the lens equivalent units. In a particular embodiment, the number of the first electrodes corresponding to each of the lens equivalent units may be adjusted by adjusting the voltage of the first electrode according to a view mode selected by the viewer, wherein the view modes include a two-view mode and a multi-view mode. By controlling the aperture of each lens equivalent unit, the multi-view mode may be implemented, and continuous viewing angles can be increased.

According to still another embodiment of the present disclosure, there is further provided a method for controlling the preceding 3D display panel, which includes adjusting the voltage of the first electrode of the control unit to change the position of each of the lens equivalent units so that a left eye image corresponding to left eye pixels of the display panel comes into sight of the left eye of the viewer and a right eye image corresponding to right eye pixels of the display panel comes into sight of the right eye of the viewer.

In a particular embodiment, the method for controlling the 3D display panel may include following steps:

i): detecting a change of the position of a viewer's eye by an eye tracking unit; and ii): adjusting the voltage of the first electrode according to the change of the position of the viewer's eye by the control unit to change the position of each lens equivalent unit.

The controlling method provided by this embodiment is used for the 3D display panels described in the preceding embodiments and shown in FIG. 8. The structures, functions and/or advantages of the 3D display panel in this embodiment are the same as those of the 3D display panel in the preceding embodiment, and thus are not unnecessarily elaborated any more herein.

In an exemplary embodiment, the method for controlling the 3D display panel further includes adjusting, by adjusting the voltage of the first electrode by the control unit, the number of the first electrodes corresponding to each of the lens equivalent units so as to change the aperture of each of the lens equivalent units. In this configuration, by controlling the aperture of each lens equivalent unit, the multi-view mode may be implemented, and continuous viewing angles may be increased.

It shall be appreciated that, the units or modules such as the control unit, the calculation unit, the eye tracking unit described herein may be implemented as a combination of a processor and a memory, wherein the processor executes a program stored in the memory to implement the functionality of the corresponding units or modules. The units or modules describes herein may also be completely implemented by hardware, including but not limited to Application Specific Integrated Circuits (ASICs), Field Programmable Gate Arrays (FPGAs).

As used herein and in the appended claims, the singular form of a word includes the plural, and vice versa, unless the context clearly dictates otherwise. Thus, singular words are generally inclusive of the plurals of the respective terms. Similarly, the words "include" and "including" are to be interpreted inclusively rather than exclusively. Likewise, the terms "comprise" and "comprising" should all be construed to be inclusive, unless such an interpretation is clearly prohibited from the context. Where used herein the term "examples," particularly when followed by a listing of terms is merely exemplary and illustrative, and should not be deemed to be exclusive or comprehensive.

In addition, the flowcharts as depicted in the present disclosure are merely exemplary. There may be many variations to the flowcharts or steps described therein without departing from the spirit of the present disclosure. For instance, the steps may be performed in a differing order or steps may be added, deleted or modified.

The preceding description of the embodiments is provided for the purpose of illustration and description, and is not intended to be exhaustive or to limit the present disclosure. Various components or features of specific embodiments generally are not limited to specific embodiments. However, these components and features are interchangeable and may be used in selected embodiments even without specific illustration or description, where appropriate. Likewise, changes may be made in many ways. These changes are not deemed to depart from the present disclosure, and all these changes are included in the scope of the present disclosure.

What is claimed is:

1. A 3D display panel comprising a display module and a liquid crystal lens, wherein the liquid crystal lens is positioned at a light exit side of the display module, wherein the liquid crystal lens comprises a first substrate, a second substrate, a plurality of first electrodes arranged on the first substrate, a second electrode arranged on the second substrate, a liquid crystal layer arranged between the first substrate and the second substrate, and a control unit, and wherein:

the control unit is configured to control a voltage of the first electrode and of the second electrode so that liquid crystal molecules in the liquid crystal laser deflect to form a plurality of lens equivalent units; and the control unit is further configured to adjust the voltage of the first electrode to change a position of each of the lens equivalent units, and to adjust, by adjusting the voltage of the first electrode, a number of the first electrodes corresponding to each of the lens equivalent units to change an aperture of each of the lens equivalent units, so as to implement multi-view mode display and increase continuous viewing angles.

2. The 3D display panel according to claim 1, wherein each of the lens equivalent units corresponds to one of i) two adjacent rows of pixels in the display module, and ii) two adjacent columns of pixels in the display module, so that when displayed, an image corresponding to left eye pixels comes into sight of a left eye of the viewer and an image corresponding to right eye pixels comes into sight of a right eye of the viewer.

3. A method for controlling the 3D display panel according to claim 1, comprising:

adjusting the voltage of the first electrode by the control unit to change the position of each of the lens equivalent units so that a left eye image corresponding to left eye pixels of the display panel comes into sight of a left eye of the viewer and a right eye image corresponding to right eye pixels of the display panel comes into sight of a right eye of the viewer, wherein the method further comprises adjusting, by adjusting the voltage of the first electrode by the control unit, a number of the first electrodes corresponding to each of the lens equivalent units to change an aperture of each of the lens equivalent units, so as to implement multi-view mode display and increase continuous viewing angles.

4. The method according to claim 3, wherein the liquid crystal lens further comprises an eye tracking unit, wherein the method further comprises:

detecting a change of a position of a viewer's eye by the eye tracking unit, wherein:

adjusting the voltage of the first electrode by the control unit comprises adjusting the voltage of the first electrode according to the change of the position of the viewer's eye by the control unit.

5. The 3D display panel according to claim 1, further comprising an eye tracking unit, wherein the eye tracking unit is configured to track a change of a position of a viewer's eye, and wherein the control unit is further configured to adjust the voltage of the first electrode according to the change of the position of the viewer's eye so that the position of each of the lens equivalent units varies with the change of the position of the viewer's eye.

6. The 3D display panel according to claim 1, wherein the first electrodes are one of i) strip electrodes and ii) dot matrix electrodes, and wherein the second electrode is a planar electrode.

7. The 3D display panel according to claim 1, wherein the lens equivalent unit is cylindrical.

8. The 3D display panel according to claim 1, wherein the position of each of the lens equivalent units is confined by 3-20 first electrodes.

* * * * *

UNITED STATES PATENT AND TRADEMARK OFFICE
CERTIFICATE OF CORRECTION

PATENT NO. : 10,466,568 B2
APPLICATION NO. : 15/554818
DATED : November 5, 2019
INVENTOR(S) : Wenqing Zhao et al.

Page 1 of 1

It is certified that error appears in the above-identified patent and that said Letters Patent is hereby corrected as shown below:

In the Claims

In Claim 1, Column 10, Line 1, delete "crystal laser deflect" and insert therefor -- crystal layer deflect --.

Signed and Sealed this
Twenty-fourth Day of December, 2019

Andrei Iancu
*Director of the United States Patent and Trademark Office*